(12) United States Patent
Brochu

(10) Patent No.: US 12,091,861 B2
(45) Date of Patent: Sep. 17, 2024

(54) GUTTER ASSEMBLY AND GUTTER COVER THEREFOR

(71) Applicant: Stephane Brochu, Lévis (CA)

(72) Inventor: Stephane Brochu, Lévis (CA)

( * ) Notice: Subject to any disclaimer, the term of this patent is extended or adjusted under 35 U.S.C. 154(b) by 29 days.

(21) Appl. No.: 17/726,105

(22) Filed: Apr. 21, 2022

(65) Prior Publication Data

US 2022/0356708 A1 Nov. 10, 2022

Related U.S. Application Data

(60) Provisional application No. 63/201,571, filed on May 5, 2021.

(51) Int. Cl.
*E04D 13/076* (2006.01)
(52) U.S. Cl.
CPC ................... *E04D 13/076* (2013.01)
(58) Field of Classification Search
CPC ..................... E04D 13/076; E04D 13/068
USPC ................................................ 52/12
See application file for complete search history.

(56) References Cited

U.S. PATENT DOCUMENTS

| | | |
|---|---|---|
| D90,272 S | 7/1933 | White |
| 2,277,443 A | 3/1942 | Livingston |
| 3,042,742 A | 7/1962 | Foster |
| 3,295,803 A | 1/1967 | Blayden |
| 3,436,878 A | 4/1969 | Singer |
| 4,241,548 A | 12/1980 | Rowe |
| 4,808,234 A | 2/1989 | Mckay et al. |
| 4,820,407 A | 4/1989 | Lilie |
| 5,406,754 A | 4/1995 | Cosby |
| 5,619,825 A | 4/1997 | Leroney et al. |
| 5,744,218 A | 4/1998 | Barnes |
| 5,906,287 A | 5/1999 | Kohnen |
| 6,134,843 A | 10/2000 | Tregear |
| D460,197 S | 7/2002 | Stringer |
| 6,427,388 B1 | 8/2002 | Brochu |
| D468,446 S | 1/2003 | Sender et al. |
| 6,701,674 B1 | 3/2004 | Albracht |
| 6,786,008 B2 | 9/2004 | Brochu |

(Continued)

FOREIGN PATENT DOCUMENTS

| | | |
|---|---|---|
| CA | 2305159 A1 | 10/2001 |
| CA | 2451186 A1 | 1/2003 |

(Continued)

*Primary Examiner* — Babajide A Demuren
(74) *Attorney, Agent, or Firm* — Reising Ethington P.C.

(57) ABSTRACT

A gutter cover for covering an open top of a gutter, comprising: a central cover portion positionable over the open top; a rear cover mounting portion extending rearwardly from a rear central cover portion end and being engageable with a rear gutter portion of the gutter; and a front cover mounting portion extending forwardly from a front central cover portion end and being engageable with the front gutter portion, the front cover mounting portion being configured such that a distal front mounting portion end of the front cover mounting portion is located under the central cover portion and rearward of the front central cover portion end and such that a reinforcement portion of the front cover mounting portion adjacent the distal front mounting portion end is superposed against a bottom central portion surface of the central cover portion, the reinforcement portion being secured to the central cover portion.

19 Claims, 7 Drawing Sheets

(56) References Cited

U.S. PATENT DOCUMENTS

| | | |
|---|---|---|
| 6,826,872 B2 | 12/2004 | Brochu |
| D523,538 S | 6/2006 | Brochu |
| D532,969 S | 6/2006 | Abruzese et al. |
| D551,740 S | 9/2007 | Riley |
| D558,309 S | 12/2007 | Gregg |
| D569,011 S | 5/2008 | Brochu |
| 7,614,185 B2 | 11/2009 | Brochu |
| 7,624,541 B2 | 12/2009 | Gentry |
| 7,658,036 B2 | 2/2010 | Banks et al. |
| 7,765,743 B2 | 8/2010 | Guilford |
| 7,908,797 B2 | 3/2011 | Graves |
| 7,913,458 B2 | 3/2011 | Higginbotham |
| 8,037,641 B2 | 10/2011 | Gerig |
| D651,292 S | 12/2011 | Geers |
| 8,191,315 B1 | 6/2012 | Brochu |
| 8,322,082 B2 | 12/2012 | Neumann |
| 8,347,557 B2 | 1/2013 | Minor, Sr. et al. |
| 8,375,644 B2 | 2/2013 | Robins |
| D677,405 S | 3/2013 | Landis |
| 8,434,269 B1 | 5/2013 | Brochu |
| 8,479,454 B2 | 7/2013 | Lenney et al. |
| 8,635,811 B2 | 1/2014 | Horton |
| 8,776,444 B2 | 7/2014 | Beck et al. |
| D719,648 S | 12/2014 | Moody et al. |
| D721,826 S | 1/2015 | Ryan |
| D723,671 S | 3/2015 | Brochu |
| 8,997,403 B1 | 4/2015 | Steinberg |
| 9,010,029 B2 | 4/2015 | Higginbotham |
| 9,010,030 B2 | 4/2015 | Davis |
| D736,900 S | 8/2015 | Frelier |
| 9,127,463 B1 | 9/2015 | Feldhaus |
| 9,163,406 B1 | 10/2015 | Ealer, Sr. |
| D742,541 S | 11/2015 | Ryan |
| D770,603 S | 11/2016 | Fryml |
| D782,624 S | 3/2017 | Haendel |
| D792,985 S | 7/2017 | Jones |
| D796,067 S | 8/2017 | Landis et al. |
| 10,100,522 B2 | 10/2018 | Beck et al. |
| 11,060,293 B2 | 7/2021 | Graves |
| 2003/0110712 A1 | 6/2003 | Brochu |
| 2004/0060244 A1 | 4/2004 | Brochu |
| 2004/0118052 A1 | 6/2004 | Brochu |
| 2004/0182014 A1 | 9/2004 | Brochu |
| 2004/0244302 A1 | 12/2004 | Neumann |
| 2005/0028452 A1 | 2/2005 | Brochu |
| 2005/0115160 A1 | 6/2005 | Brochu |
| 2005/0193642 A1 | 9/2005 | Brochu et al. |
| 2005/0193671 A1 | 9/2005 | Brochu et al. |
| 2005/0223657 A1 | 10/2005 | Brochu et al. |
| 2005/0279036 A1 | 12/2005 | Brochu |
| 2006/0037254 A1 | 2/2006 | Brochu |
| 2006/0037255 A1 | 2/2006 | Brochu |
| 2006/0123710 A1 | 6/2006 | Lenney et al. |
| 2006/0283097 A1 | 12/2006 | Gregg |
| 2007/0167130 A1 | 7/2007 | Brochu |
| 2007/0169423 A1 | 7/2007 | Brochu |
| 2008/0010906 A1 | 1/2008 | Brochu |
| 2008/0163561 A1 | 7/2008 | Lenney et al. |
| 2008/0190039 A1 | 8/2008 | Brochu |
| 2008/0190070 A1 | 8/2008 | Duncan et al. |
| 2008/0289263 A1 | 11/2008 | Brochu |
| 2009/0013612 A1 | 1/2009 | Brochu |
| 2009/0056234 A1 | 3/2009 | Brochu |
| 2009/0108144 A1 | 4/2009 | Brochu |
| 2010/0287846 A1 | 11/2010 | Lenney |
| 2011/0056145 A1 | 3/2011 | Lenney |
| 2011/0067317 A1 | 3/2011 | Hedrick |
| 2011/0067318 A1 | 3/2011 | Lenney et al. |
| 2011/0138698 A1 | 6/2011 | Neumann |
| 2012/0151849 A1 | 6/2012 | Brochu |
| 2013/0091780 A1* | 4/2013 | Robins .................. E04D 13/076 52/12 |
| 2014/0069028 A1 | 3/2014 | Lenney |
| 2014/0202086 A1* | 7/2014 | Reese .................. E04D 13/076 52/12 |
| 2014/0215929 A1 | 8/2014 | Lenney |
| 2015/0020462 A1 | 1/2015 | Iannelli |
| 2015/0040488 A1 | 2/2015 | Lenney |
| 2015/0143756 A1 | 5/2015 | Higginbotham |
| 2015/0225959 A1 | 8/2015 | Lenney |
| 2015/0330085 A1 | 11/2015 | Iannelli |
| 2016/0060870 A1 | 3/2016 | Martin |
| 2016/0168859 A1* | 6/2016 | Vargas .................. E04D 13/064 52/716.2 |
| 2016/0369512 A1 | 12/2016 | Lenney |
| 2018/0030733 A1 | 2/2018 | Brochu |
| 2019/0071874 A1* | 3/2019 | Brochu ................ H02K 21/024 |
| 2019/0136536 A1* | 5/2019 | Brochu ................ E04D 13/076 |
| 2020/0157820 A1 | 5/2020 | Lenney |
| 2021/0285224 A1 | 9/2021 | Graves |

FOREIGN PATENT DOCUMENTS

| | | |
|---|---|---|
| CA | 2405756 A1 | 3/2004 |
| CA | 2458005 A1 | 8/2005 |
| CA | 2460429 A1 | 9/2005 |
| CA | 2541186 A1 | 7/2007 |
| CA | 2593808 A1 | 1/2009 |
| CA | 2608530 A1 | 4/2009 |
| CA | 2747704 A1 | 7/2009 |
| CA | 2723499 A1 | 3/2011 |
| CA | 2727844 A1 | 7/2012 |
| CA | 2747513 A1 | 1/2013 |
| CA | 2783834 A1 | 8/2013 |
| CA | 2775864 A1 | 11/2013 |
| CA | 2933239 A1 | 7/2015 |
| CA | 2863023 A1 | 3/2016 |
| CA | 166698 S | 8/2016 |
| CA | 169577 S | 2/2017 |
| CA | 2907280 A1 | 2/2017 |
| CA | 2955268 A1 | 7/2017 |
| CA | 2919709 A1 | 8/2017 |
| CA | 2963962 A1 | 10/2017 |
| CA | 2931540 A1 | 11/2017 |
| CA | 175672 S | 4/2018 |
| CA | 2985004 A1 | 5/2018 |
| CA | 3016527 A1 | 3/2019 |
| CA | 3023339 A1 | 5/2019 |
| CA | 3045555 A1 | 12/2020 |
| EP | 1449980 A1 | 8/2004 |
| EP | 1627974 A2 | 2/2006 |
| EP | 2159342 A1 | 3/2010 |
| EP | 2177685 A1 | 4/2010 |
| EP | 2251500 A1 | 11/2010 |
| GB | 2481033 A | 12/2011 |
| GB | 2493284 A | 1/2013 |
| WO | 2007100320 A1 | 9/2007 |
| WO | 2008134845 A1 | 11/2008 |
| WO | 2009150174 A1 | 12/2009 |

* cited by examiner

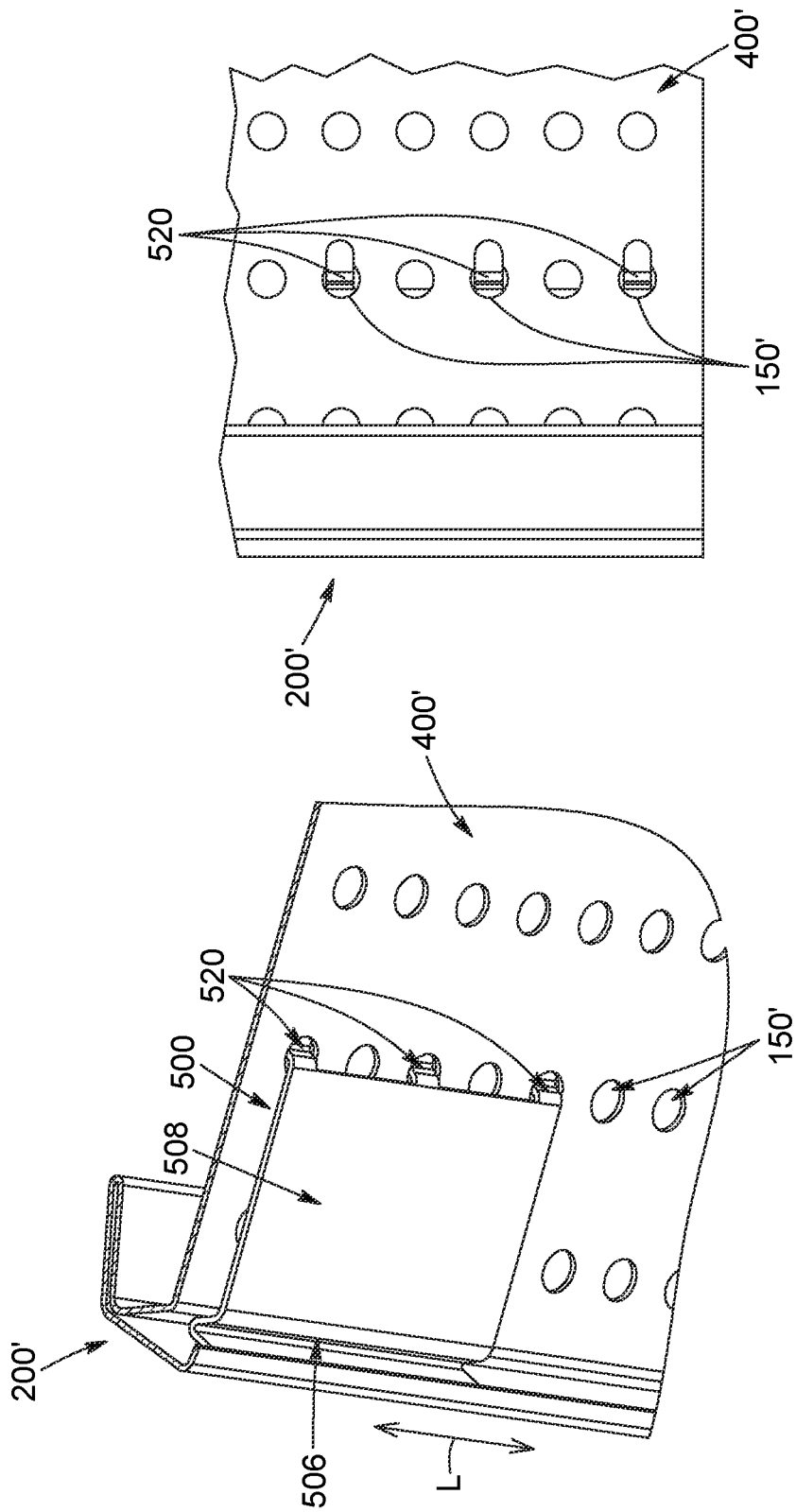

GUTTER ASSEMBLY AND GUTTER COVER THEREFOR

CROSS-REFERENCE TO RELATED APPLICATION(S)

The present application claims priority from U.S. Provisional Patent Application No. 63/201,571, filed on May 5, 2021, the entire specification of which is incorporated herein by reference.

TECHNICAL FIELD

The technical field generally relates to gutter assemblies, and more specifically to gutter assemblies including a gutter cover and a gutter and to gutter covers for the same.

BACKGROUND

Rain gutters are useful to collect rainwater that runs off the roof of a house or of a building and to route collected rainwater away from the foundation to a proper drainage area in order to avoid damages to the foundation, the soffit, the windows and/or the doors, for instance. Rain gutters generally include a trough channeling the rainwater to a downpipe or downspout, the trough being affixed to a supporting structure of the house or building such as the fascia board.

Leaves and debris may accumulate within the trough of the gutter, which can prevent the rainwater from flowing through the trough. Gutter guards or gutter covers are used to protect the gutter by preventing leaves and debris from enter the trough of the gutter while still permitting rainwater to enter the trough.

SUMMARY

According to one aspect, there is provided A gutter cover for covering an open top of a gutter, the gutter having a front gutter portion, a rear gutter portion and a bottom gutter wall defining together a gutter channel, the gutter cover comprising: a central cover portion positionable over the open top of the gutter, the central cover portion having front and rear central cover portion ends, the central cover portion further having top and bottom central portion surfaces; a rear cover mounting portion extending rearwardly from the rear central cover portion end, the rear cover mounting portion being engageable with the rear gutter portion; and a front cover mounting portion extending forwardly from the front central cover portion end, the front cover mounting portion being engageable with the front gutter portion, the front cover mounting portion having a proximal front mounting end located at the front central cover portion end, a distal front mounting portion end and a reinforcement portion adjacent the distal front mounting portion end, the front cover mounting portion being configured such that the distal front mounting portion end is located under the central cover portion and rearward of the front central cover portion end and such that the reinforcement portion is superposed against the bottom central portion surface, the reinforcement portion being secured to the central cover portion.

In at least one embodiment, the front cover mounting portion is folded to form a hook portion extending upwardly from the central cover portion and a descending portion extending downwardly from the hook portion, the reinforcement portion extending between the descending portion and the distal front mounting portion end.

In at least one embodiment, the hook portion further extends rearwardly towards the rear cover mounting portion for engaging a front inner lip of the front gutter portion.

In at least one embodiment, the hook portion includes a proximal hook segment extending rearwardly and a distal hook segment folded forwardly over the proximal hook segment at a 180-degree angle so as to be superposed over the proximal hook segment.

In at least one embodiment, the hook portion further includes an upright segment extending upwardly between the front central cover portion end and the proximal hook segment.

In at least one embodiment, the upright segment is angled relative to the central cover portion at a substantially obtuse angle.

In at least one embodiment, the descending portion further extends substantially forwardly from the hook portion.

In at least one embodiment, the reinforcement portion further comprises a substantially V-shaped fold extending upwardly between the descending segment and the distal front mounting portion.

In at least one embodiment, the hook portion, the descending portion and the reinforcement portion are integrally formed together in a single sheet member.

In at least one embodiment, the central cover portion is further integrally formed together with the hook portion, the descending portion and the reinforcement portion in the single sheet member.

In at least one embodiment, the rear cover mounting portion is further integrally formed together with the hook portion, the descending portion, the reinforcement portion and the central cover portion in the single sheet member.

In at least one embodiment, the sheet member includes a first sheet member section shaped to define the hook portion and the descending portion and a second sheet member section shaped to define the reinforcement portion, the second sheet member section forming a reinforcement member distinct from the first sheet member, the reinforcement member extending between the distal front mounting portion end and a front reinforcement member end engaged with and supported by the first sheet member section.

In at least one embodiment, the front cover mounting portion includes a reinforcement-connecting segment extending rearwardly from the descending portion for receiving and supporting the front reinforcement member end.

In at least one embodiment, the reinforcement member includes a V-shaped fold portion located towards the front reinforcement member end.

In at least one embodiment, the V-shaped fold portion is configured to extend upwardly between the hook portion and the descending portion of the front cover mounting portion when the reinforcement member is secured to the central cover portion.

In at least one embodiment, the V-shaped fold portion includes front and rear fold segments angled away from each other, the front fold segment having a lower end segment end defining the front reinforcement member end and abutting an upper surface of the reinforcement-connecting segment.

In at least one embodiment, the front fold segment is substantially longer that the rear fold segment.

In at least one embodiment, the reinforcement member has a reinforcement member width defined along a longitudinal axis of the cover, the reinforcement member width being substantially smaller than a width of the central cover portion defined along the longitudinal axis of the cover.

In at least one embodiment, the central cover portion is further integrally formed together with the hook portion and the descending portion in the first sheet member section.

In at least one embodiment, the rear cover mounting portion is further integrally formed together with the hook portion, the descending portion and the central cover portion in the first sheet member section.

In at least one embodiment, the central cover portion comprises at least one tab receiving opening extending therethrough and the reinforcement portion further comprises a rear connecting section engageable with at least one of the tab receiving openings to secure the reinforcement portion of the central cover portion.

In at least one embodiment, the rear connecting section includes at least one attachment tab extending rearwardly from the distal front mounting portion end, each attachment tab being engageable in a corresponding one of the tab receiving openings.

In at least one embodiment, the rear connecting section of the reinforcement portion is substantially planar and superposable against the bottom central portion surface, the rear connecting section extending along a planar section plane, all of the at least one attachment tab being planar and extending in a tab plane, the planar section plane and the tab plane being substantially parallel to each other and being spaced by a distance corresponding substantially to a thickness of the central cover portion.

In at least one embodiment, the at least one attachment tab includes between two tabs and five tabs.

In at least one embodiment, the at least one attachment tab includes three attachment tabs.

In at least one embodiment, the distal front mounting portion end is permanently secured to the central cover portion.

According to another aspect, there is also provided a gutter assembly comprising: a gutter having a front gutter portion, a rear gutter portion and a bottom wall defining together a gutter channel having an open top; a gutter cover for covering the open top of the gutter, the gutter cover comprising: a central cover portion positionable over the open top of the gutter, the central cover portion having front and rear central cover portion ends, the central cover portion further having top and bottom central portion surfaces; a rear cover mounting portion extending from the rear central cover portion end, the rear cover mounting portion being engageable with the rear gutter portion; and a front cover mounting portion extending forwardly from the front central cover portion end, the front cover mounting portion being engageable with the front gutter portion, the front cover mounting portion having a proximal front mounting end located at the front central cover portion end, a distal front mounting portion end and a reinforcement portion adjacent the distal front mounting portion end, the front cover mounting portion being configured such that the distal front mounting portion end is located under the central cover portion and rearward of the front central cover portion end and such that the reinforcement portion is superposed against the bottom central portion surface, the reinforcement portion being secured to the central cover portion.

In at least one embodiment, the front cover mounting portion is folded to form a hook portion extending upwardly from the central cover portion and a descending portion extending downwardly from the hook portion, the reinforcement portion extending between the descending portion and the distal front mounting portion end.

In at least one embodiment, the front gutter portion includes a front inner lip, and wherein the hook portion further extends rearwardly towards the rear cover mounting portion for engaging the front inner lip.

In at least one embodiment, the hook portion includes a proximal hook segment extending rearwardly and a distal hook segment folded forwardly over the proximal hook segment at a 180-degree angle so as to be superposed over the proximal hook segment.

In at least one embodiment, the hook portion further includes an upright segment extending upwardly between the front central cover portion end and the proximal hook segment.

In at least one embodiment, the upright segment is angled relative to the central cover portion at a substantially obtuse angle.

In at least one embodiment, the descending portion further extends substantially forwardly from the hook portion.

In at least one embodiment, the reinforcement portion further comprises a substantially V-shaped fold extending upwardly between the descending segment and the distal front mounting portion.

In at least one embodiment, the hook portion, the descending portion and the reinforcement portion are integrally formed together in a single sheet member.

In at least one embodiment, the central cover portion is further integrally formed together with the hook portion, the descending portion and the reinforcement portion in the single sheet member.

In at least one embodiment, the rear cover mounting portion is further integrally formed together with the hook portion, the descending portion, the reinforcement portion and the central cover portion in the single sheet member.

In at least one embodiment, the sheet member includes a first sheet member section shaped to define the hook portion and the descending portion and a second sheet member section shaped to define the reinforcement portion, the second sheet member section forming a reinforcement member distinct from the first sheet member, the reinforcement member extending between the distal front mounting portion end and a front reinforcement member end engaged with and supported by the first sheet member section.

In at least one embodiment, the front cover mounting portion includes a reinforcement-connecting segment extending rearwardly from the descending portion for receiving and supporting the front reinforcement member end.

In at least one embodiment, the reinforcement member includes a V-shaped fold portion located towards the front reinforcement member end.

In at least one embodiment, the V-shaped fold portion is configured to extend upwardly between the hook portion and the descending portion of the front cover mounting portion when the reinforcement member is secured to the central cover portion.

In at least one embodiment, the V-shaped fold portion includes front and rear fold segments angled away from each other, the front fold segment having a lower end segment end defining the front reinforcement member end and abutting an upper surface of the reinforcement-connecting segment.

In at least one embodiment, the front fold segment is substantially longer that the rear fold segment.

In at least one embodiment, the reinforcement member has a reinforcement member width defined along a longitudinal axis of the cover, the reinforcement member width being substantially smaller than a width of the central cover portion defined along the longitudinal axis of the cover.

In at least one embodiment, the central cover portion is further integrally formed together with the hook portion and the descending portion in the first sheet member section.

In at least one embodiment, the rear cover mounting portion is further integrally formed together with the hook portion, the descending portion and the central cover portion in the first sheet member section.

In at least one embodiment, the central cover portion comprises a plurality of tab receiving openings extending therethrough and the reinforcement portion further comprises a rear connecting section and at least one attachment tab extending rearwardly from the rear connecting section and including the rear reinforcement portion end, each tab being engageable in a corresponding one of the tab receiving openings.

In at least one embodiment, the central cover portion has a plurality of drainage throughholes defined therein for allowing liquids to enter the gutter channel, the tab receiving openings comprising corresponding ones of the plurality of drainage throughholes.

In at least one embodiment, the at least one attachment tab includes between two tabs and five tabs.

In at least one embodiment, the at least one attachment tab includes three attachment tabs.

In at least one embodiment, the distal front mounting portion end is permanently secured to the central cover portion.

According to yet another embodiment, there is also provided a reinforcement member for a gutter cover, the gutter cover including a central cover portion and front and rear cover mounting portions, the central cover portion having top and bottom central portion surfaces with tab receiving openings extending therethrough, the front cover mounting portion comprising a sheet member shaped to form a hook portion extending upwardly from the central cover portion and towards the rear cover mounting portion and a descending portion extending downwardly from the hook portion, forwardly thereof, the reinforcement member comprising: a sheet member having a front reinforcement portion end, a rear reinforcement portion end including at least one attachment tab, and a rear connecting section extending rearwardly from the front reinforcement member end and being substantially planar, the reinforcement member being engageable with the gutter cover with the front reinforcement portion end engaging the descending portion of the gutter cover and the at least one attachment tab of the rear reinforcement member end engaging a corresponding one of the tab receiving opening by being inserted therethrough such that the rear connecting section is superposed against the bottom central portion surface of the central cover portion of the gutter cover.

In at least one embodiment, the reinforcement member further comprises a substantially V-shaped fold extending upwardly and forwardly from the rear connecting section.

In at least one embodiment, the V-shaped fold portion is configured to extend upwardly between the hook portion and the descending portion of the front cover mounting portion when the reinforcement member is secured to the central cover portion.

In at least one embodiment, the V-shaped fold portion includes front and rear fold segments angled away from each other, the front fold segment having a lower end segment end defining the front reinforcement member end and abutting an upper surface of the reinforcement-connecting segment.

In at least one embodiment, the front fold segment is substantially longer that the rear fold segment.

In at least one embodiment, the reinforcement member has a reinforcement member width defined along a longitudinal axis of the cover, the reinforcement member width being substantially smaller than a width of the central cover portion defined along the longitudinal axis of the cover.

According to another aspect, there is also provided a kit for covering an open top of a gutter, the kit comprising: a gutter cover, the gutter cover including a central cover portion and front and rear cover mounting portions, the central cover portion having top and bottom central portion surfaces with tab receiving openings extending therethrough, the front cover mounting portion comprising a sheet member shaped to form a hook portion extending upwardly from the central cover portion and towards the rear cover mounting portion and a descending portion extending downwardly from the hook portion, forwardly thereof; and a reinforcement member as defined hereinabove.

According to yet another aspect, there is also provided a gutter cover for covering an open top of a gutter having a front gutter portion, a rear gutter portion and a bottom gutter portion defining together a gutter channel, the gutter cover comprising: a front and a rear cover mounting portions engageable respectively with the front gutter portion and the rear gutter portion; a central cover portion extending between the front and rear cover mounting portions above the gutter channel, the central cover portion having top and bottom central portion surfaces with tab receiving openings extending therethrough, wherein the front cover mounting portion comprises a hook portion extending upwardly from the central cover portion and towards the rear cover mounting portion, a descending portion extending downwardly from the hook portion, forwardly thereof, and a reinforcement portion extending rearwardly from a lower end of the descending portion, the reinforcement portion including a rear connecting section superposed against the bottom central portion surface of the central cover portion, and ending at a distal front mounting portion end secured to the central cover portion.

BRIEF DESCRIPTION OF THE DRAWINGS

FIG. 6 is an enlarged portion of a bottom perspective view of the front cover mounting portion and of part of the central cover portion of the gutter cover illustrated in FIG. 3, with the reinforcement member mounted thereto.

FIG. 7 is a top plan view of the front cover mounting portion and of part of the central cover portion of the gutter cover illustrated in FIG. 3, with the reinforcement member mounted thereto.

DETAILED DESCRIPTION

Figure 1:
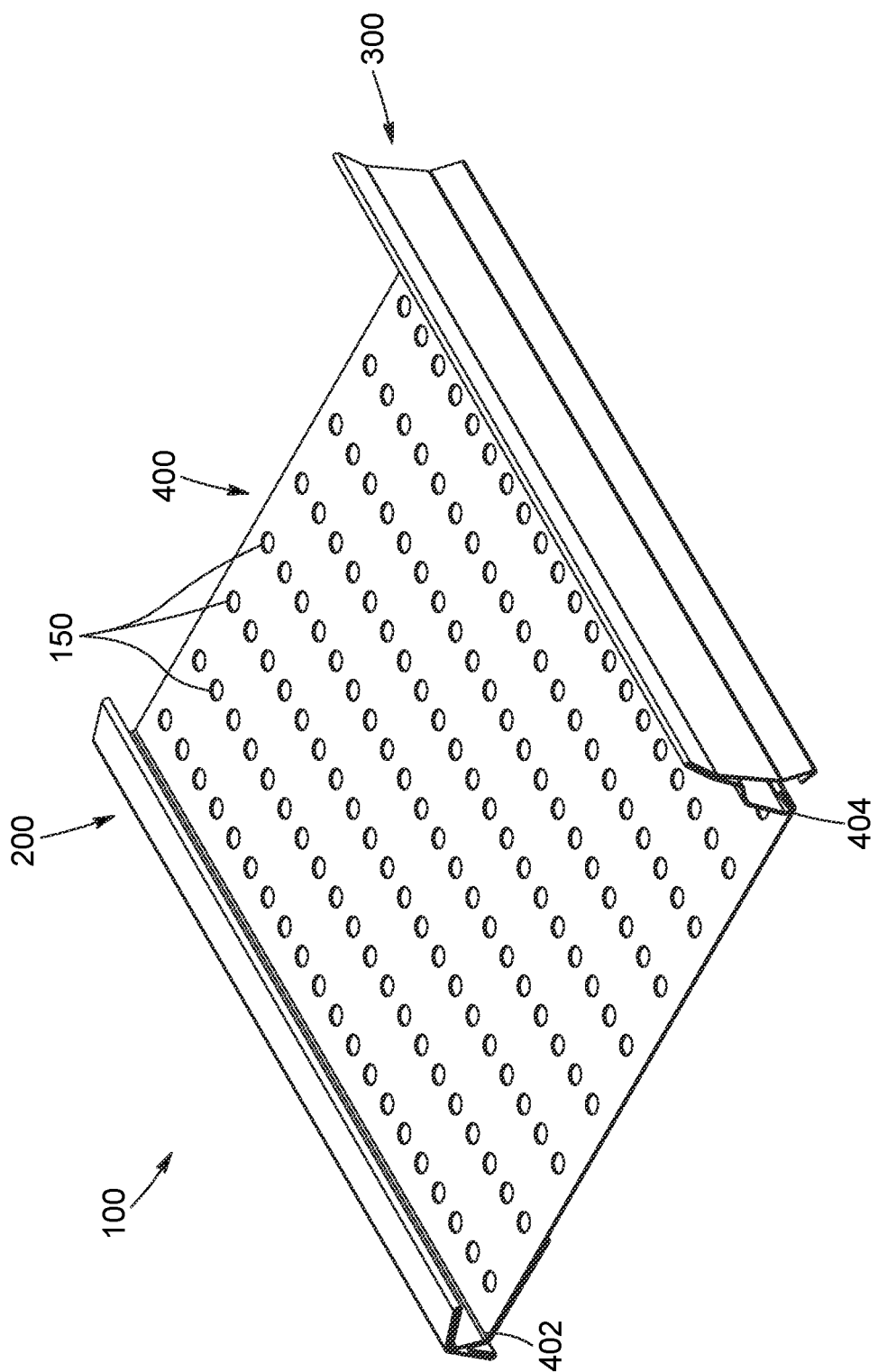
FIG. 1 is a rear perspective view of a gutter cover, in accordance with one embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "top", "bottom", "forward", "rearward" "left", "right" and the like should, unless otherwise indicated, be taken in the context of the figures and correspond to the position and orientation in the gutter, gutter cover and corresponding parts when being used. Positional descriptions should not be considered limiting.

Figure 2A:
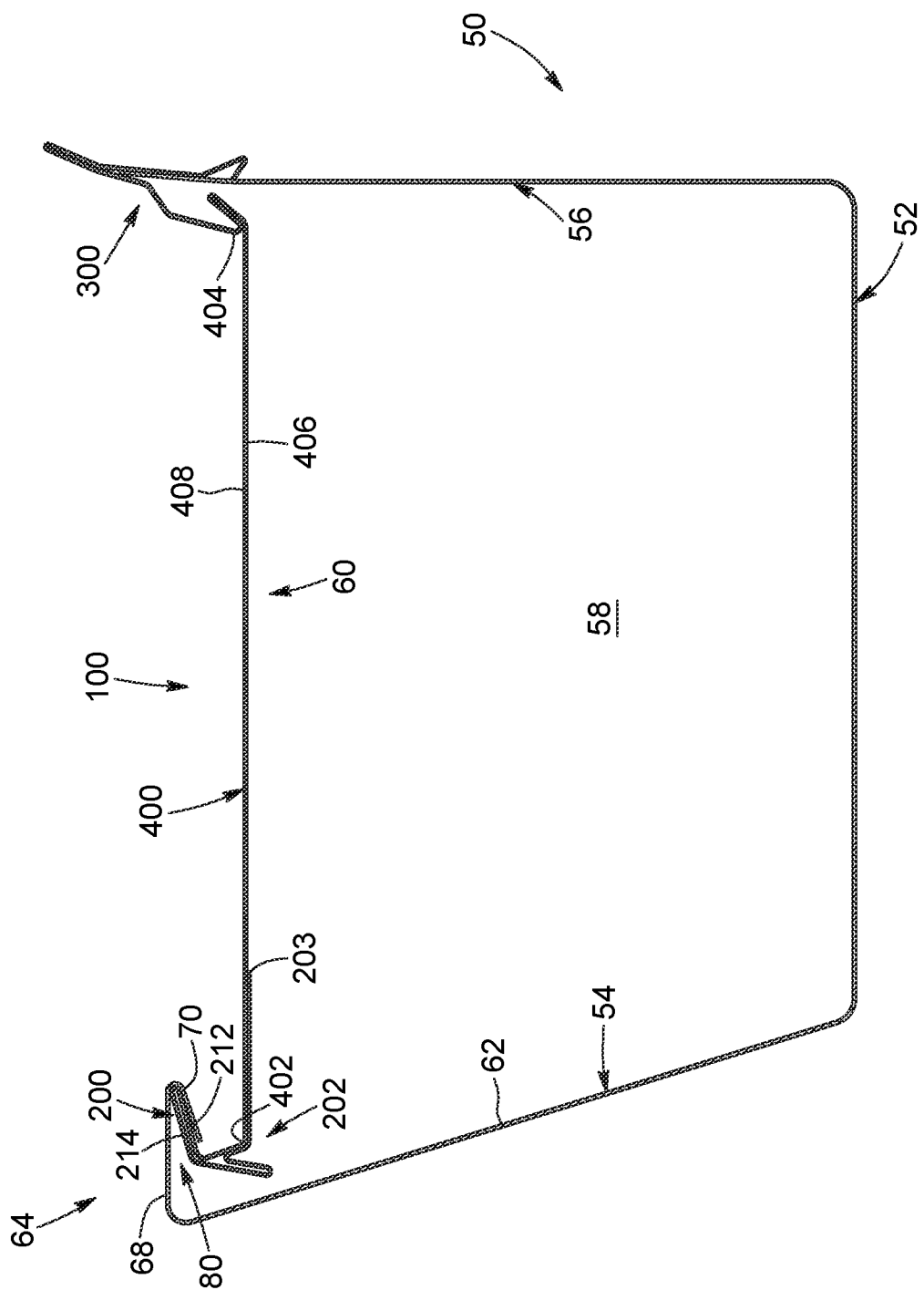
FIG. 2A is a cross-section view of the gutter cover illustrated in FIG. 1 installed on a gutter.
Figure 2B:
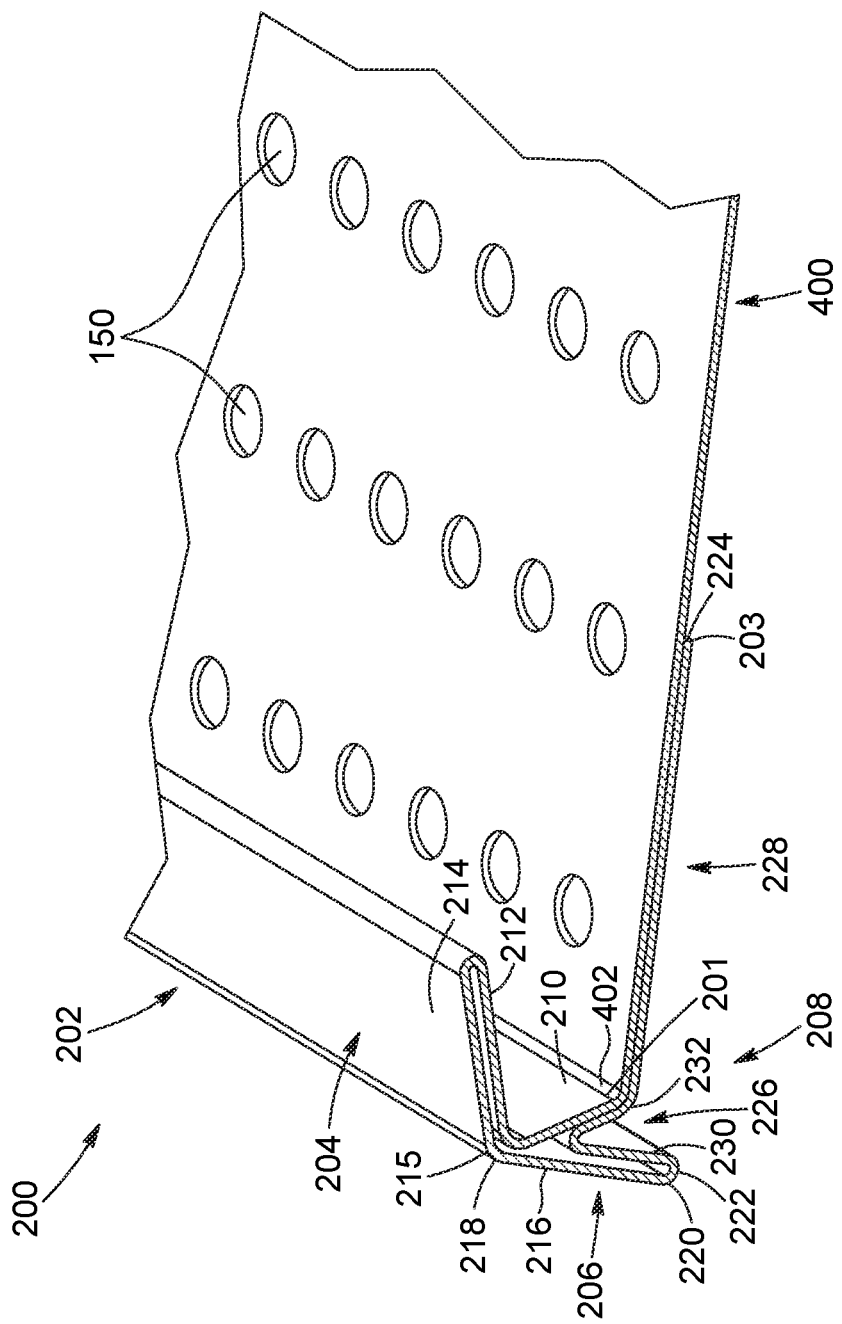
FIG. 2B is an enlarged side view of a front cover mounting portion of the gutter cover illustrated in FIG. 1.
Figure 3:
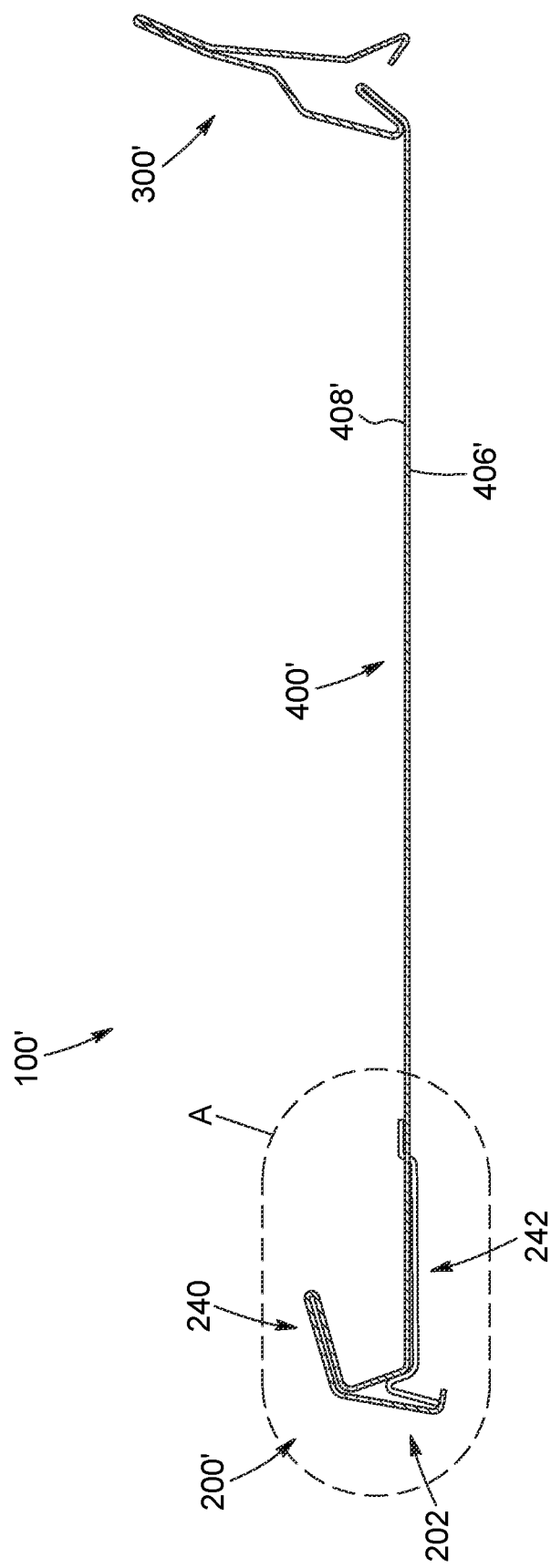
FIG. 3 is a side elevation view of a gutter cover, in accordance with another embodiment.

Referring to FIGS. 1 to 2B, there is shown a gutter cover 100, in accordance with one embodiment. The gutter cover 100 is installable on a gutter 50, shown in FIG. 2A, which can be secured to a supporting surface, such as a wall and/or a roof of a building.

As further shown in FIG. 2A, the gutter 50 includes a bottom gutter wall 52 and front and rear gutter portions 54, 56 extending upwardly from the bottom gutter wall 52 to define a gutter channel 58 having an open top 60. The front gutter portion 54 includes an upright portion 62 extending upwardly from the bottom gutter wall 52 and a front inner lip 64 which extends rearwardly from the upright portion 62. In the illustrated embodiment, the front inner lip 64 is substantially wedge-shaped and includes a rim segment 68 and a front flange 70 angled away from the rim segment 68 at an acute angle, thereby defining a front receiving cavity 80 between the rim segment 68 and the front flange 70. Alternatively, instead of being wedge-shaped, the front inner lip 64 could instead be substantially rectangular or have any other suitable shape.

In the illustrated embodiment, the gutter cover 100 includes a front cover mounting portion 200 configured for engaging the front gutter portion 54 of the gutter 100, a rear cover mounting portion 300 configured for engaging the rear gutter portion 56 and a central cover portion 400 extending between the front and rear cover mounting portions 200, 300. As shown in FIG. 2A, when installed on the gutter 50, the gutter cover 100 thereby covers the open top 60 of the gutter 50.

Still in the illustrated embodiment and referring more particularly to FIGS. 1 and 2A, the central cover portion 400 is substantially planar and extends between a front central cover portion end 402 and a rear central cover portion end 404. The central cover portion 400 also has a bottom central portion surface 406 which, when the gutter cover 100 is installed on the gutter 50, faces downwardly towards the bottom gutter wall 52 and a top central portion surface 408 which faces upwardly and away from the bottom gutter wall 52.

The central cover portion 400 further has a plurality of drainage throughholes 150 defined therein to allow liquid such as rainwater to enter the gutter 50 through its open top 60. In the illustrated embodiment, the drainage throughholes 150 are arranged in a plurality of throughhole rows extending in a lengthwise direction relative to the gutter cover 100. Alternatively, the drainage throughholes 150 may instead be arranged according to any other suitable pattern or configuration. Still in the illustrated embodiment, the drainage throughholes 150 are substantially circular but alternatively, the drainage throughholes 150 could have any other suitable shape.

In the illustrated embodiment, the front cover mounting portion 200 comprises a sheet member 202 extending forwardly from the front central cover portion end 402. Specifically, the front cover mounting portion 200 extends between a proximal front mounting portion end 201 located at the front central cover portion end 402 and a distal front mounting portion end 203 located away from the proximal front mounting portion end 201. As shown in FIGS. 2A and 2B, the sheet member 202 is folded into a desired configuration to engage the front inner lip 64 of the front gutter portion 54. Specifically, the sheet member 202 is shaped to form a hook portion 204 extending substantially upwardly from the central cover portion 400, a descending portion 206 which extends downwardly from the hook portion 204 and a reinforcement portion 208 which extends rearwardly from the descending portion 206 to the distal front mounting portion end 203. In another embodiment, instead of being formed from a single sheet member 202, the hook portion 204, the descending portion 206 and/or the reinforcement portion 208 could be provided as distinct pieces that could be secured to each other by welding, clinching or press-joining, using fasteners or using any other suitable securing technique to form the front cover mounting portion 200.

In the illustrated embodiment, the hook portion 204 includes an upright segment 210, a proximal hook segment 212 and a distal hook segment 214. The upright segment 210 extends upwardly and slightly forwardly from the proximal front mounting portion end 201 (i.e. from the front central cover portion end 402). The proximal hook segment 212 is located adjacent to the upright segment 210 and extends rearwardly and upwardly from the upright segment 210. The distal hook segment 214 is folded forwardly over the proximal hook segment 212 at a 180-degree angle such that the distal hook segment 214 is superposed over the proximal hook segment 212. The proximal and distal hook segments 212, 214 are substantially planar and are sized and shaped to be received in the front receiving cavity 80 and to abut the front flange 70, as shown in FIG. 2A, such that the gutter cover 100 is suspended from the front flange 70 at the front cover mounting portion 200.

It will be understood that the above description of the hook portion 204 is merely provided as an example and that the hook portion 204 may be configured in accordance with any configuration suitable for engaging the front inner lip 64 of the gutter 50 to which the gutter cover 100 is to be installed. For example, in one embodiment, the hook portion 204 could include proximal and distal hook segments as described above, but may not include an upright segment 210 such that the proximal hook segment extends directly from the front central cover portion end 402. Alternatively, instead of including an upright segment 210 and proximal and distal hook segments 212, 214, the hook portion 204 could instead be made of a single continuously curved segment, could include a plurality of curved segments, could include a plurality of straight segments which are angled relative to each other, could include a combination of one or more curved segments and one or more straight segments or could have any other configuration suitable for engaging the front inner lip 64 of the gutter 50. In another embodiment, the gutter 50 may not include a front inner lip, or the front cover mounting portion 200 may not be configured to engage a front inner lip of the gutter 50. In this embodiment, the front cover mounting portion 200 may not include a hook portion 204 and could instead be configured in any configuration suitable to engage the front gutter portion 54.

In the illustrated embodiment, the descending portion 206 includes a single, substantially planar descending segment 216 which extends downwardly and slightly forwardly between an upper end 218 located at (i.e. coincides with) a lower distal segment end 215 of the distal hook segment 214 and a lower end 220 located away from the upper end 218. Specifically, the substantially planar descending segment 216 is sized such that its lower end 220 is located below the central cover portion 400, as best shown in FIG. 2A. Alternatively, the descending portion 206 may not be limited to a single, substantially planar segment and may instead include any number of segments, some or all of which may be planar, curved or have any other suitable configuration.

As best shown in FIG. 2B, the reinforcement portion 208 is sized and shaped to contact the bottom central portion surface 406 along a portion thereof, and is secured to the central cover portion 400 to prevent movement of the distal front mounting portion end 203 relative to the central cover portion 400. It will be appreciated that in conditions where heavy debris or snow is received on the central cover portion 400, a significant downward force may be exerted on the central cover portion 400, which may tend to deform the front cover mounting portion 200—especially the hook portion 204, by which the front of the gutter cover 100 is suspended from the front inner lip 64—and thereby damage the gutter cover 100. In some cases, this downward force on the central cover portion 400 could even cause the front cover mounting portion 200 to become entirely disengaged from the front gutter portion 54. Securing the reinforcement portion 208, and thereby the distal front mounting portion end 203, to the central cover portion 400 will tend provide more rigidity to the entire front cover mounting portion 200 to be able to better resist this downward force.

In the illustrated embodiment, the reinforcement portion 208 extends between a front reinforcement portion end 222 which is adjacent the lower end 220 of the descending portion 206 and a rear connecting portion end 224, which corresponds to the distal front mounting portion end 203 of the sheet member 202.

In the illustrated embodiment, the front reinforcement portion end 222 is delimitated from the lower end 220 of the descending portion 206 by a fold of the sheet member 202 defined thereinbetween. Similarly, the upper end 218 of the descending portion 206 is delimitated from the distal hook segment 214 by a fold of the sheet member 202 with an obtuse angle defined between the distal hook segment 214 and the descending portion 206.

In the illustrated embodiment, the reinforcement portion 208 includes a V-shaped lower fold 226 located towards the front connecting portion end 222 and a rear connecting section 228 located towards the rear connecting portion end 224. The V-shaped lower fold 226 extends substantially upwardly and comprises front and rear fold segments 230, 232 which are angled away from each other. As best shown in FIG. 2A, the V-shaped lower fold 226 is adjacent, almost superposed to, the descending portion 206 such that the V-shaped lower fold 226 is received between the substantially planar descending segment 216 and the upright segment 210 of the hook portion 204. It will be appreciated that in this configuration, the V-shaped lower fold 226 will tend to further oppose deformation of the front cover mounting portion 200 when a downward force is applied on the gutter cover 100. More specifically, a downward force applied on the central cover portion 400 would likely urge the upright segment 210 of the hook portion 204 to bend in order to pivot the hook portion 204 forwardly. However, it will be appreciated that this motion would tend to cause the upright segment 210, the front and rear fold segments 230, 232 and the descending segment 216 of the descending portion 206 to become substantially parallel to each other and superposed to each other, thereby creating a four-ply structure which provides enhanced rigidity to increase resistance to bending of the upright segment 210. In another embodiment, the reinforcement portion 208 may not include a V-shaped lower fold 226 and can instead be entirely planar or have any other suitable configuration.

In the illustrated embodiment, the front fold segment 230 is substantially parallel to the substantially planar descending segment 216 and the rear fold segment is substantially parallel to the upright segment 210. In other words, the angle between the front and rear fold segments 230 is substantially the same as the angle between the substantially planar descending segment 216 and the upright segment 210. Alternatively, the angle between the front and rear fold segments 230, 232 could instead be wider than the angle between the substantially planar descending segment 216 and the upright segment 210.

In the illustrated embodiment, the rear connecting section 228 is substantially planar and is superposed to the bottom central portion surface 404 of the central cover portion 400. In one embodiment, the rear connecting section 228 is sized such that it does not extend rearwardly beyond the drainage throughholes 150 closest to the front cover mounting portion 200 to avoid blocking any drainage throughholes 150. Alternatively, the rear connecting section 228 could be configured to extend beyond the drainage throughholes 150 closest to the front cover mounting portion 200 without blocking or without completely blocking any of the drainage throughholes 150. For example, the rear connecting section 228 could include one or more openings aligned with corresponding drainage throughholes 150. In yet another embodiment, the rear connecting section 228 could extend over and block one or more of the drainage throughholes 150. In one embodiment, the rear connecting section 228 could under an entire width of the central cover portion 400 and be secured to the central cover portion 400 near the rear central cover portion end 404 or to the rear cover mounting portion 300. In this embodiment, the central cover portion 400 and the rear connecting section 228 would therefore form a double-walled body of the gutter cover 100.

The rear connecting section 228 is further secured to the central cover portion 400 using a known securing technique. In one embodiment, the rear connecting section 228 is secured to the central cover portion 400 by clinching or press-joining the rear connecting section 228 to the central cover portion 400 along or near the rear reinforcement portion end 203. Alternatively, the rear connecting section 228 could be secured to the central cover portion 400 using mechanical fasteners such as screws, rivets or the like, adhesive, by welding, by brazing or using any other suitable securing technique. In some embodiments, the rear connecting section 228 could be permanently secured to the central cover portion 400. In other embodiments, the rear connecting section 228 could be removably secured to the central cover portion 400 using a system of tabs engaging corresponding receiving openings, as will be explained further below, or any other interlocking system.

In the illustrated embodiment, the sheet member 202 includes a single, continuous sheet such that the hook portion 204, the descending portion 206 and the reinforcement portion 208 are all integrally formed with each other. Alternatively, the sheet member 202 could be provided in two or more sections which are distinct from each other, as will be described further below.

Still in the illustrated embodiment, the sheet member 202 further extends rearwardly from the front cover mounting portion 200 to form the central cover portion 400 and the rear cover mounting portion 300. In other words, the entire gutter cover 100 is made of a single sheet of material which has been shaped, by folding, according to a desired shape. Alternatively, the sheet member 202 of the front cover mounting portion 200 could be distinct from the central cover portion 400 and could be secured thereto using mechanical fasteners, adhesive, welding or any other suitable securing technique.

Referring now to FIGS. 3 to 7, there is shown a gutter cover 100', in accordance with another embodiment. The gutter cover 100' can be used with a gutter such as the gutter 50 illustrated in FIG. 2A.

Similarly to the gutter cover 100, the gutter cover 100' includes a front cover mounting portion 200', a rear cover mounting portion 300' and a central cover portion 400' extending between the front and rear cover mounting portions 200', 300'. The central cover portion 400' has bottom and top central portion surfaces 406', 408'. The front and rear cover mounting portion 200', 300' are configured to engage respectively with the front and rear gutter portions 54, 56 such that the bottom central portion surface 406' faces downwardly towards the bottom gutter portion 52 and the top central portion surface 408' faces upwardly away from the bottom gutter portion 52.

The front cover mounting portion 200' includes a sheet member 202' which is shaped in a suitable configuration to engage the front gutter portion 54. In this embodiment, instead of the entire front cover mounting portion 200' being integrally formed as a single, continuous sheet member, the sheet member 202' includes two sheet member sections 240, 242 which are distinct from each other. Specifically, the sheet member 202' includes a first sheet member section 240 which is shaped to form a hook portion 204' and a descending portion 206', and a second sheet member section 242 which is shaped to form a reinforcement member 500 which is distinct or separate from the first sheet member section 240.

Similarly to the hook portion 204, the hook portion 204' includes an upright segment 210' and proximal and distal hook segments 212', 214' which are substantially similar to the upright segment 212, the proximal segment 212 and the distal hook segment 214, respectively.

Figure 4:
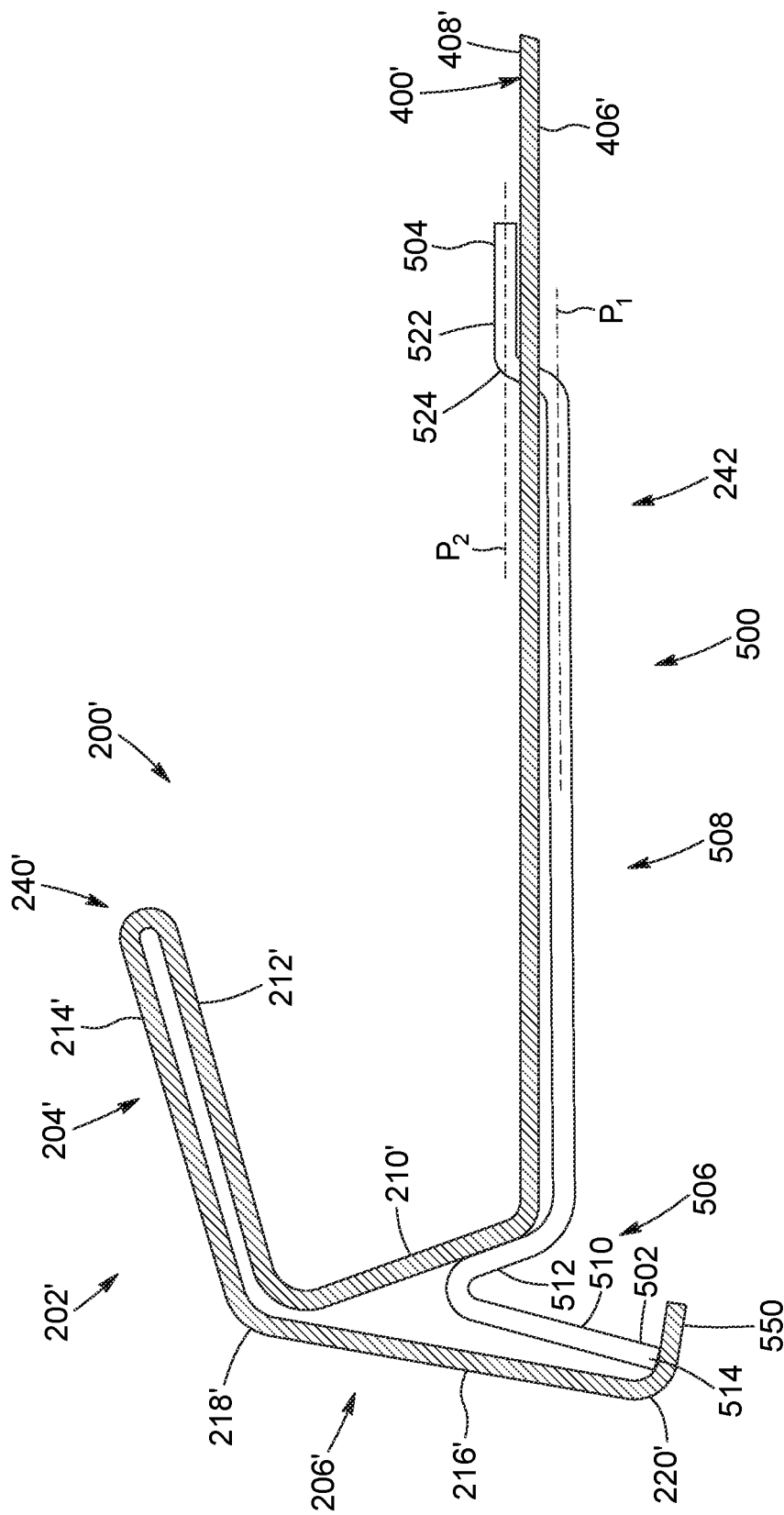
FIG. 4 is an enlarged side view, taken from area A, of a front cover mounting portion of the gutter cover illustrated in FIG. 3.

The descending portion 206' is also similar to the descending portion 206 and includes a single, substantially planar descending segment 216' which extends downwardly and slightly forwardly between an upper end 218' located adjacent the distal hook segment 214' and a lower end 220' which, as best shown in FIG. 4, is located substantially lower than the central cover portion 400'. In this embodiment, instead of being secured to or integrally formed with the reinforcement member 500, the descending portion 206' ends with a reinforcement-connecting segment 550 configured for supporting and holding the reinforcement member 500 when the reinforcement member 500 is secured to the central cover portion 400'. More specifically, the reinforcement-connecting segment 550 extends rearwardly from the lower end 220' of the descending segment 216'. The reinforcement-connecting segment 550 is configured to receive and support a portion of the reinforcement member 500 thereon, as will be explained below.

Figure 5:
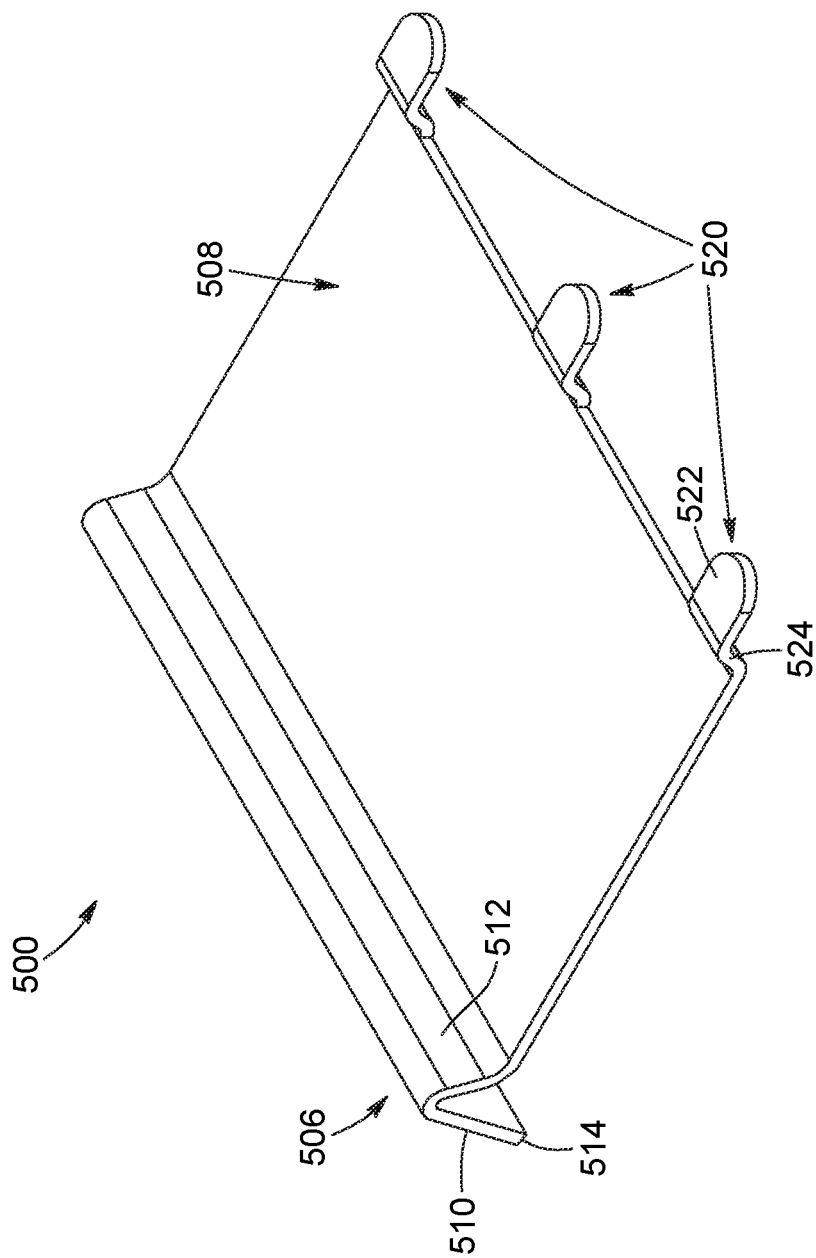
FIG. 5 is a rear perspective view of a reinforcement member for the gutter cover illustrated in FIG. 3.

As best shown in FIG. 5, the reinforcement member 500 is configured generally similarly to the reinforcement portion 208 of the gutter cover 100 illustrated in FIGS. 1 to 2B. Specifically, the reinforcement member 500 extends between a front reinforcement member end 502 and a rear reinforcement member end 504, and includes a V-shaped fold portion 506 located towards the front reinforcement member end 502 and a rear connecting section 508 located towards the rear reinforcement member end 504 and superposed to a front section of the central cover portion 400'. The V-shaped fold portion 506 and the rear connecting section 508 are substantially similar respectively to the V-shaped lower fold 226 and the rear connecting section 228 of the gutter cover 100 illustrated in FIGS. 1 to 2B.

The rear connecting section 508 is substantially planar and extends rearwardly from the V-shaped fold portion 506. As best shown in FIG. 4, the rear connecting section 508 is configured to be substantially superposed against the bottom central cover surface 406' of the central cover portion 400'.

Referring now to FIGS. 4 and 5, the reinforcement member 500 further includes a plurality of attachment tabs 520 extending rearwardly from the rear reinforcement member end 504. The attachments tabs 520 are sized and shaped to engage corresponding tab receiving openings defined in the central cover portion 400'. In the illustrated embodiment, the corresponding tab receiving openings comprises corresponding ones of drainage throughholes 150' defined in the central cover portion 400'. It will be appreciated that in this embodiment, the drainage throughholes 150' which receive the attachment tabs 520 may be at least partially blocked by the attachment tabs 520, but that using drainage throughholes 150' which are already provided in the central cover portion 400 eliminates the need to further perforate the central cover portion 400. Alternatively, the central cover portion 400 could include separate, dedicated tab receiving openings to receive the attachment tabs 520.

In FIG. 5, the illustrated section of the reinforcement member 500 includes three (3) attachment tabs 520. It will be understood that in other embodiments, the reinforcement member 500 can have more or less than three attachment tabs 520. For example, in some embodiments, the reinforcement member 500 could include between two and five attachment tabs 520.

In the illustrated embodiment, each attachment tab 520 has a substantially S-shaped profile and includes an abutment portion 522 which is substantially planar and an elbow portion 524 which extends between the rear connecting section 508 and the abutment portion 522. As best shown in FIG. 4, the abutment portion 522 extends substantially parallel to the rear connecting section 508, but does not extend in the same plane as the rear connecting section 508. More specifically, the rear connecting section 508 extends in a rear connecting section plane $P_1$ while the attachment tabs 520 extend in a tab plane $P_2$ which is parallel to the rear connecting section plane $P_1$, but which is spaced from the rear connecting section plane $P_1$. In the illustrated embodiment, the attachment tabs 520 are located above the rear connecting section 508 when the gutter cover 100' is engaged with the gutter 50, such that the tab plane P$_2$ is located above the rear connecting section plane P$_1$. In the present embodiment, the rear connecting section plane P$_1$ and the tab plane P$_2$ are spaced from each other by a distance corresponding substantially to a thickness of the central cover portion 400'. According to this configuration, when the attachments tabs 520 are received in their corresponding tab receiving openings 150' of the central cover portion 400', i.e. with the elbow portion 524 extending through the receiving openings 150', the rear connecting section 508 can be substantially superposed to the bottom central portion surface 406' while the abutment portions 522 of the attachment tabs 520 are substantially superposed to the top central portion surface 408'.

Similarly to the V-shaped lower fold 226, the V-shaped fold portion 506 comprises front and rear fold segments 510, 512 which are angled away from each other. The front fold segment 510 has a lower fold segment end 514 which abuts an upper surface of the reinforcement-connecting segment 550. When the rear connecting section 508 is substantially superposed to the bottom central portion surface 406', the reinforcement member 500 is therefore held at the front by the reinforcement-connecting segment 550 and at the rear by the attachment tabs 520. In this position, the rear fold segment 512 further abuts the upright segment 210' of the hook portion 204' to further hold the reinforcement member 500.

As best shown in FIG. 4, since the reinforcement-connecting segment 550 is located substantially lower than the central cover portion 400', the front fold segment 510 is substantially longer than the rear fold segment 512 to reach the reinforcement-connecting segment 550 when the rear connecting section 508 is substantially superposed to the bottom central portion surface 406'. It will be understood that this configuration may facilitate the installation of the reinforcement member 500 on the reinforcement-connecting segment 550. In another embodiment, the reinforcement-connecting segment 550 may be located higher and the front fold segment 510 may accordingly be shorter in length.

In the illustrated embodiment, the reinforcement-connecting segment 550 extends slightly downwardly as it extends rearwardly which may further facilitate the engagement of the reinforcement member 500 with the reinforcement-connecting segment 550. Alternatively, the reinforcement-connecting segment 550 could be substantially parallel to the central cover portion 400'. In yet another embodiment, the reinforcement-connecting segment 550 could instead extend upwardly as it extends rearwardly to form a hook portion for holding the lower fold segment end 514 and contributing to prevent rearward movement of the reinforcement member 500.

As shown in FIG. 6, in this embodiment, the reinforcement member 500 is substantially narrower than the central cover portion 400', along a longitudinal axis of the gutter cover 100'. In one embodiment, the gutter cover 100' could therefore include a plurality of reinforcement members 500 which could be spaced-apart from one another, either evenly or unevenly, along the central cover portion 400' in a longitudinal direction relative to the gutter cover 100'. Alternatively, the reinforcement member 500 could be substantially as long as the central cover portion 400' and extend along the entire length of the central cover portion 400'.

It will be appreciated that the gutter cover 100' provided with the reinforcement member 500 could offer substantially the same increased rigidity and resistance to bending as the gutter cover 100 illustrated in FIGS. 1 to 2B.

Moreover, the reinforcement member 500, being separate from the rest of the gutter, could be provided to a user separately from the rest of the gutter cover 100'. The user would therefore have the option of acquiring reinforcement members 500 is desired or needed. A user who is already in possession of a gutter cover similar to the gutter cover 100' but without reinforcement members 500 could also be provided with one or more reinforcement member 500 to retrofit the gutter cover 100' and increase its rigidity and resistance to bending.

In another embodiment, the reinforcement member 500 could be provided with the rest of the gutter cover 100' as a kit. The user would then have the option of using the reinforcement member 500 if desired or needed.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A gutter cover for covering an open top of a gutter, the gutter having a front gutter portion, a rear gutter portion and a bottom gutter wall defining together a gutter channel, the gutter cover comprising:
   a central cover portion positionable over the open top of the gutter, the central cover portion having front and rear central cover portion ends delimitated by a respective fold, the central cover portion extending along a substantially horizontal plane between the front and rear central cover portion ends and further having top and bottom central portion surfaces;
   a rear cover mounting portion extending rearwardly from the rear central cover portion end, the rear cover mounting portion being engageable with the rear gutter portion; and
   a front cover mounting portion extending forwardly from the front central cover portion end, the front cover mounting portion being engageable with the front gutter portion, the front cover mounting portion having a proximal front mounting end located at the front central cover portion end, a distal front mounting portion end and a reinforcement portion adjacent the distal front mounting portion end, the front cover mounting portion being configured such that the distal front mounting portion end is located under the central cover portion and rearward of the front central cover portion end and such that the reinforcement portion is superposed against the bottom central portion surface, the reinforcement portion is united with the central cover portion by at least one of clinching, press-joining, mechanical fasteners, welding, and brazing.

2. The gutter cover as claimed in claim 1, wherein the front cover mounting portion is folded to form a hook portion extending upwardly and rearwardly from the central cover portion and a descending portion extending downwardly from the hook portion, the reinforcement portion extending between the descending portion and the distal front mounting portion end.

3. The gutter cover as claimed in claim 2, wherein the hook portion includes a proximal hook segment extending rearwardly and a distal hook segment folded forwardly over the proximal hook segment at a 180-degree angle so as to be superposed over the proximal hook segment.

4. The gutter cover as claimed in claim 3, wherein the hook portion further includes an upright segment extending upwardly between the front central cover portion end and the proximal hook segment.

5. The gutter cover as claimed in claim 4, wherein the upright segment is angled relative to the central cover portion at a substantially obtuse angle.

6. The gutter cover as claimed in claim 2, wherein the reinforcement portion further comprises a substantially V-shaped fold extending upwardly between the descending segment and the distal front mounting portion.

7. The gutter cover as claimed in claim 2, wherein the hook portion, the descending portion and the reinforcement portion are integrally formed together in a single sheet member.

8. The gutter cover as claimed in claim 2, wherein the gutter cover includes a first sheet member section shaped to define the hook portion and the descending portion and a second sheet member section shaped to define the reinforcement portion, the second sheet member section forming a reinforcement member distinct from the first sheet member, the reinforcement member extending between the distal front mounting portion end and a front reinforcement member end engaged with and supported by the first sheet member section.

9. The gutter cover as claimed in claim 8, wherein the front cover mounting portion includes a reinforcement-connecting segment extending rearwardly from the descending portion for receiving and supporting the front reinforcement member end.

10. The gutter cover as claimed in claim 8, wherein the reinforcement member includes a V-shaped fold portion located towards the front reinforcement member end, the V-shaped fold portion being configured to extend upwardly between the hook portion and the descending portion of the front cover mounting portion when the reinforcement member is secured to the central cover portion.

11. The gutter cover as claimed in claim 8, wherein the reinforcement member has a reinforcement member width defined along a longitudinal axis of the cover, the reinforcement member width being substantially smaller than a width of the central cover portion defined along the longitudinal axis of the cover.

12. The gutter cover as claimed in claim 1, wherein the distal front mounting portion end is permanently secured to the central cover portion.

13. A gutter assembly comprising:
a gutter having a front gutter portion, a rear gutter portion and a bottom wall defining together a gutter channel having an open top;
a gutter cover for covering the open top of the gutter, the gutter cover comprising:
a central cover portion positionable over the open top of the gutter, the central cover portion having front and rear central cover portion ends delimitated by a respective fold, the central cover portion further having top and bottom central portion surfaces;
a rear cover mounting portion extending from the rear central cover portion end, the rear cover mounting portion being engageable with the rear gutter portion; and
a front cover mounting portion extending forwardly and upwardly from the front central cover portion end, the front cover mounting portion being engageable with the front gutter portion, the front cover mounting portion having a proximal front mounting end located at the front central cover portion end, a distal front mounting portion end and a reinforcement portion adjacent the distal front mounting portion end, the front cover mounting portion being configured such that the distal front mounting portion end is located under the central cover portion and rearward of the front central cover portion end and such that the reinforcement portion is superposed against the bottom central portion surface, the reinforcement portion meshes with the central cover portion.

14. The gutter assembly as claimed in claim 13, wherein the central cover portion comprises a plurality of tab receiving openings extending therethrough and the reinforcement portion further comprises a rear connecting section and at least one attachment tab extending rearwardly from the rear connecting section and including the rear reinforcement portion end, each tab being engageable in a corresponding one of the tab receiving openings.

15. The gutter assembly as claimed in claim 14, wherein the central cover portion has a plurality of drainage throughholes defined therein for allowing liquids to enter the gutter channel, the tab receiving openings comprising corresponding ones of the plurality of drainage throughholes.

16. A reinforcement member for a gutter cover, the gutter cover including a central cover portion and front and rear cover mounting portions, the central cover portion having top and bottom central portion surfaces with tab receiving openings extending therethrough, the front cover mounting portion comprising a sheet member shaped to form a hook portion extending upwardly from the central cover portion and towards the rear cover mounting portion and a descending portion extending downwardly from the hook portion, forwardly thereof, the reinforcement member comprising:
a sheet member having a front reinforcement portion end, a rear reinforcement portion end including at least one attachment tab, and a rear connecting section extending rearwardly from the front reinforcement member end and being substantially planar, the reinforcement member being engageable with the gutter cover with the front reinforcement portion end engaging the descending portion of the gutter cover and the at least one attachment tab of the rear reinforcement member end engaging a corresponding one of the tab receiving opening by being inserted therethrough such that the rear connecting section is superposed against the bottom central portion surface of the central cover portion of the gutter cover.

17. The reinforcement member as claimed in claim 16, further comprising a substantially V-shaped fold extending upwardly and forwardly from the rear connecting section, the substantially V-shaped fold portion being configured to extend upwardly between the hook portion and the descending portion of the front cover mounting portion when the reinforcement member is secured to the central cover portion.

18. The reinforcement member as claimed in claim 16, wherein the reinforcement member has a reinforcement member width defined along a longitudinal axis of the cover, the reinforcement member width being substantially smaller than a width of the central cover portion defined along the longitudinal axis of the cover.

19. The gutter cover as defined in claim 1, wherein the reinforcement portion is united with the central cover portion at the distal front mounting portion end and/or adjacent to the distal front mounting portion end.

\* \* \* \* \*